Sept. 3, 1946.    E. A. STALKER    2,407,185
WING WITH FLAP ENCLOSING BLOWER MEANS
Filed Dec. 5, 1944    2 Sheets-Sheet 1
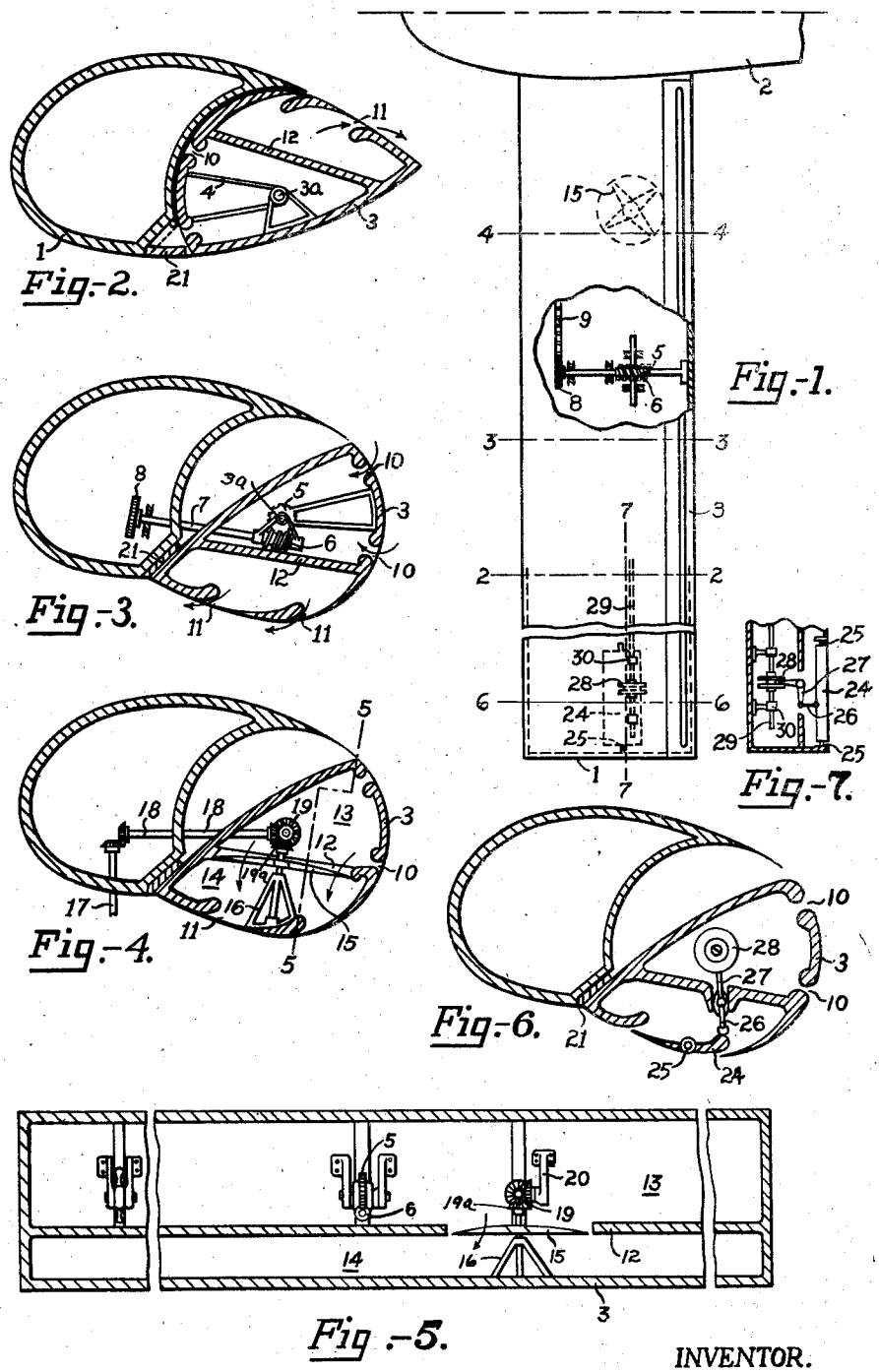
INVENTOR.
Edward A. Stalker
BY Marechal and Biebel
attorneys Sept. 3, 1946.   E. A. STALKER   2,407,185
WING WITH FLAP ENCLOSING BLOWER MEANS
Filed Dec. 5, 1944   2 Sheets-Sheet 2

INVENTOR.
Edward A. Stalker
BY
Marechal and Biebel
Attorneys

Patented Sept. 3, 1946

2,407,185

UNITED STATES PATENT OFFICE 2,407,185

WING WITH FLAP ENCLOSING A BLOWER MEANS

Edward A. Stalker, Bay City, Mich.

Application December 5, 1944, Serial No. 566,766

8 Claims. (Cl. 244—42)

This invention relates to aircraft and more particularly to wings therefor.

It is the principal object of this invention to provide an aircraft wing structure having slots for developing boundary layer control in which a blower for inducing the slot flow is located in a position where it provides for most efficient performance of the boundary layer control function and at the same time does not interfere with the maximum utilization of the available space in the wing.

It is also an object to provide a wing and flap assembly provided with one or more slots and in which the blower is positioned in the flap and is in communication with the slots by short direct passages for developing high efficiency flows through the slots.

It is also an object to provide such a wing and flap in which the blower is located in the flap and is in communication with slots located in properly spaced relation either in the flap or in the rearward portion of the wing main body, leaving the major part of the wing main body available for other purposes as desired.

It is a still further object to provide such a wing and adjustable flap with the blower located within the flap and arranged to be actuated by a drive from within the wing which is operable in the several adjustable positions of the flap.

Other objects and advantages will be apparent from the following description, the accompanying drawings, and the appended claims.

In the drawings which illustrate a preferred embodiment of the invention:

Fig. 1 is a fragmentary top plan view of the wing and fuselage with the flap in its downward rotated position, certain parts being broken away to show the construction thereof;

Fig. 2 is a sectional view along the line 2—2 of Fig. 1 with the flap in its high speed position;

Fig. 3 is a sectional view along the line 3—3 of Fig. 1 with the flap rotated to its high lift position;

Fig. 4 is a sectional view along the line 4—4 of Fig. 1 showing the blower positioned in the flap in the high lift position of the latter;

Fig. 5 is a sectional view through the flap on the line 5—5 of Fig. 4;

Fig. 6 is a sectional view on the line 6—6 of Fig. 1;

Fig. 7 is a sectional view showing the flap operating mechanism on the line 7—7 of Fig. 1;

Figure 11:
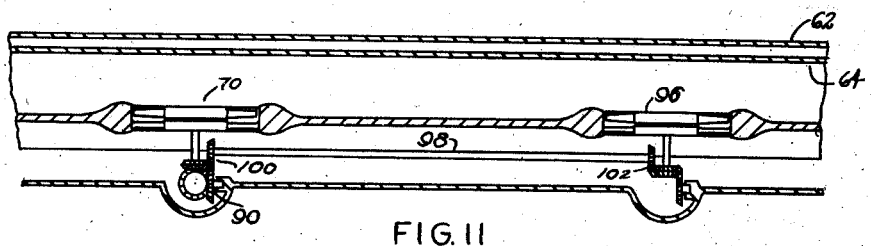
Fig. 11 is a spanwise section along the line 11—11 of Fig. 9.

This application is in part a continuation of co-pending application Serial No. 312,175 filed January 2, 1940.

The application of boundary layer control to wing structures can be made to develop high performance characteristics including both high lift and low drag, making possible the attainment of highly desirable performance characteristics. The application of boundary layer control involves the provision of slots on the wing surface and the use of power actuated blower means for inducing flows through the slots in order to energize the boundary layer air on the wing surface. Where however such blower means and its associated passages and ducts for supplying the slot flows are located in the wing main body, it detracts from the availability of space which would otherwise be usable for other purposes.

In accordance with the present invention, the maximum utilization of the normally available space in the wing is secured by locating the blower means within the wing flap. The space within the flap is usually not adaptable for use as cargo space, and thus the location of the blower in the flap does not materially detract from the useful capacity of the wing. Where the slots are confined to the flap, all of the duct work and passages for establishing communication between the blower and such slots are made quite short and direct, thus reducing losses in the blower system as well as avoiding unnecessary parts and their accompanying weight.

Where it is desired to have a flow through a portion of the wing main body, the latter may be formed with a rearward compartment which is also in direct communication with the blower, if desired opening directly to the blower, and thus affording a similar short and low resistance flow passage.

The blower is arranged to be power actuated by a drive member extending from the wing main body, which is suitably connected for the actuation of the blower means continuously throughout the adjusting movements of the flap. This is preferably accomplished by the pivotal mounting of the flap and the arrangement of the drive mechanism about the pivot axis so that a maintained driving connection is thus provided.

The invention may be applied to wing and flap constructions of different shape and aerodynamic characteristics, including both the relatively blunt flap type of wing construction as well as the pointed or relatively sharp flap constructions. Preferably the flap construction is such that when depressed, a highly cambered wing section is afforded in which the boundary layer control function is important in securing the desired results and in which the maximum efficiency of operation is secured by reason of the short and direct passages mentioned above.

Referring to the drawings which discloses a preferred embodiment of the invention, the wing main body is shown at 1 supporting a fuselage, a portion of which is indicated at 2. A flap 3 is pivotally mounted at the rear of the wing main body and is adjustable about the pivot axis 3a from the high speed position indicated in Fig. 2 to the high lift position indicated in Fig. 3.

The flap is supported on the wing main body by means of brackets 4 which support the pivot member 3a, and arranged in suitably distributed relation along the span. The shaft is rotated by the toothed sector 5 attached to the flap wall as shown in Fig. 3. Mating with the sector is the worm 6 fixed to the shaft 7 which extends into the wing main body and is turned by sprocket 8 activated from the fuselage by means of chain 9.

The flap contains the induction slots 10 and the discharge slots 11. A partition 12 divides the flap interior into two compartments 13 and 14. The partition has an opening in which is positioned one or more blowers 15 spaced spanwise of the wing. The two compartments are thus in direct communication with the blowers, one communicating with the suction side and the other with the discharge side of the blowers, to provide for induction and discharge through the slots 10 and 11 respectively.

The blower 15 is supported rotatably in the bracket 16 and is driven from the shaft 18 which extends into the wing main body and which in turn is driven from shaft 17 actuated from any suitable source of power. Gear 18 carries a beveled pinion 18a at the end thereof which meshes with bevel idler gear 19 freely journaled on the pivot axis of the flap. Gear 19 in turn has driving engagement with the beveled pinion 19a on the shaft of the blower for the power operation of the latter. From the above description it will be clear that the flap can be rotated about its pivot axis, which is also the axis of gear 19, while power is applied continuously to the blower through the gear train as described.

The flap has proper chordwise slots to accommodate the bracket 4 which is attached to the front portion of the wing and the shaft 18. Sealing flap 21 is used to seal the gap between the flap and the front portion of the wing, having the two operative positions as illustrated in Figs. 2 and 3, such flap being operated by mechanism which is well known and which thus need not be further described. By placing the center of rotation of the flap closer to the lower surface than the top of the flap, the flap is made to move so that the chord is altered to only a small degree and the area of the wing retains a high value. Also the wing with the blunt end takes upon itself a cambered form which is conducive to high lift attainments.

To control the airplane, a portion of the flap 3 is made movable, this being the vane 24 which is hinged at 25 as indicated in Fig. 7. Such vane is rotated about the axis 25 by a rod 26 suitably articulated to it and to the bell crank 27. The latter is actuated by the grooved block 28 fixed to the rod 29 slideable spanwise in the guides 30. This rod extends to the control in the fuselage. It will be readily appreciated that sliding the rod in the guides will rotate the bell crank and adjust the position of the vane 24.

The vane can be rotated so as to close the slots at its end for any position of the flap. Stopping the flow through the slots will alter the lift for any attitude of the flap.

Figure 9:
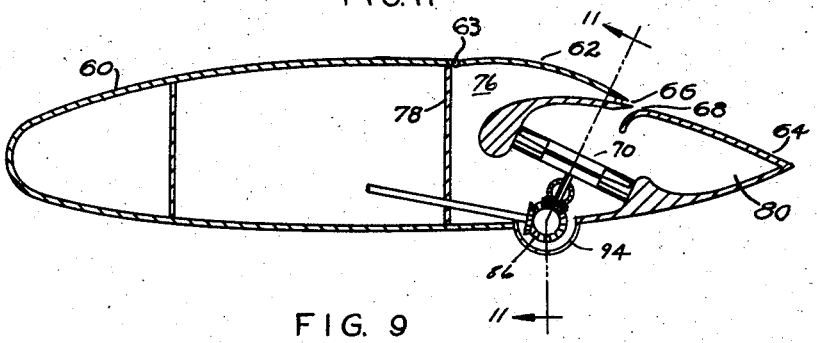
Fig. 9 is a vertical section of an enlarged scale on the line 9—9 of Fig. 8 with the flap in raised or high speed position.
Figure 10:
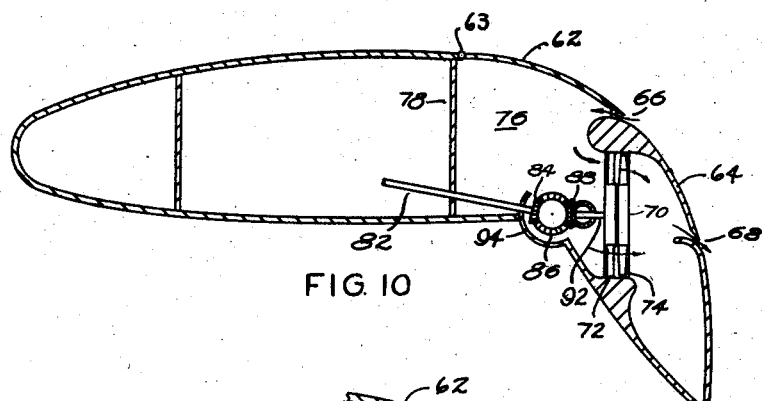
Fig. 10 is a view similar to Fig. 9 showing the flap in lowered or high lift position.
Figure 12:
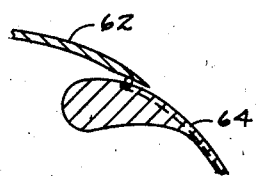
Fig. 12 is a fragmentary section of the end of the auxiliary flap and the adjacent main flap surface.
Figure 8:
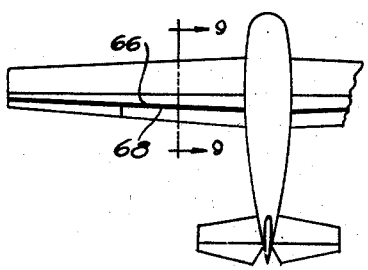
Fig. 8 is a fragmentary top plan view of an aircraft incorporating a modified type of wing construction.

Referring now to Figs. 8 through 12 which show a somewhat modified construction, the wing main body is shown at 60 having the main flap 64 and the auxiliary connecting flap 62 hingedly supported from the wing main body by pivots 63. Means are provided forming an induction slot 66 between the end of the auxiliary flap 62 and the upper surface of the main flap 64 while rearwardly thereof the upper surface of the flap 64 is formed with a discharge slot 68 extending preferably along the full span of the wing.

Blower 70 is composed of a stator 72 and the rotor 74, both mounted entirely within and movable with the adjustable flap 64. Preferably the blower is so mounted that its intake side is in direct communication with a compartment 76 formed at the rear of the wing main body. This compartment is closed by a partition 78 which defines and limits the space utilized for the boundary layer control function, leaving the entire space of the wing forwardly of such partition unencumbered and available for any desired utilization such as cargo space or the like. The opposite or discharge side of the blower is in direct communication with the hollow interior of the flap, which is formed with the compartment 80, which provides a low resistance passage for the flow of the air discharged by the blower to effect the delivery thereof to the discharge slot 68 with a minimum of loss and with the maximum efficiency. The discharge slot 68 as shown is formed with overlapping walls to deliver the jet substantially along the flap surface toward the trailing edge of the wing.

The rotor 74 of the blower is driven by the shaft 82 from a suitable source of power such as the aircraft engine. The power from this shaft is delivered through the beveled gears 84, the freely rotatable bevel pinion 86, and the bevel gear 88 on the shaft of the blower. Gear 86 is freely rotatably mounted and is carried on the pivot axis of the flap in the same manner as described above. A housing 94 encloses the gear train to shield the gear portions which would normally extend outside the lower surface of the wing, there being a separate such shield for each of the drives. A second blower 96 similar to blower 70 is driven from the first blower by means of the cross shaft 98 and the bevel gear trains 100 and 102, and in a similar way additional blowers may be mounted and driven to the extent desired.

From the above it will be understood that the incorporation of the boundary layer control function in the manner herein described is both compact and economical of space, leaving substantially the entire usable space of the wing available for any desired purpose, but also it provides the most convenient and efficient positioning of the blower making possible the use of short flow passages of substantial cross-section which will afford maximum efficiency and freedom from losses. Further such blower means is arranged to be driven economically from a power source within the wing main body, and with a drive which is maintained effective throughout the necessary adjusting movements of the wing flap.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A wing structure of the character described which comprises a wing main body, a flap adjustably supported on said body to define a wing therewith, means forming a slot in said wing for developing boundary layer control, blower means located in said flap, and means establishing communication between said blower and said slot to induce a flow therethrough.

2. A wing structure of the character described which comprises a wing main body, a flap adjustably supported on said body to define a wing therewith, means forming slots in said flap for developing boundary layer control, blower means located entirely in said flap and adjacent said slots, and short flow passages in direct communication between said slots and said blower.

3. A wing structure of the character described which comprises a wing main body adjustably supported on said body to define a wing therewith, a flap, means forming a slot in said wing for developing boundary layer control, blower means located in said flap, drive means operable throughout the adjustment of said flap for operating said blower means, and means establishing communication between said blower and said slot to induce a flow therethrough.

4. A wing structure of the character described which comprises a wing main body, a flap, means for pivotally supporting said flap in adjustable relation upon said wing main body to form a wing, means forming a slot in said wing for developing boundary layer control, blower means located entirely in said flap and communicating with said slots, and drive means for said blower means supported on said pivot axis providing a maintained driving connection throughout the adjusting movements of said flap.

5. A wing structure of the character described which comprises a wing main body, a flap adjustably supported thereon to form a wing, means dividing said flap into two compartments, means forming slots in said wing for developing boundary layer control, communicating passages connecting said compartments respectively with said slots, and blower means within said flap and having its inlet and discharge sides communicating with said two compartments to induce flows through said slots.

6. A wing structure of the character described which comprises a wing main body having a rearward compartment therein, a flap adjustably supported from said wing main body to form a wing, means forming slots in said wing for developing boundary layer control, blower means supported in said flap and having communication through the flap interior with one of said slots and through said rearward compartment of the wing main body with another of said slots.

7. A wing structure of the character described which comprises a wing main body, a rear partition extending spanwise to divide the wing interior into a forward and a rear compartment, a flap adjustably supported on said wing main body forming a wing therewith, means defining a compartment in said flap in communication with said rear compartment, means forming a slot in the upper surface of said wing for developing boundary layer control thereover, communicating passages connecting said flap compartment and said rear compartment with said slot means, and blower means within a said compartment aft of said partition and having its inlet and discharge communicating with said flap compartment and said rear compartment to induce a flow through said slot means.

8. A wing structure of the character described which comprises a wing main body, a partition dividing the wing interior into a forward compartment extending over the major portion of the chordwise length of said wing main body and a rear compartment, a flap adjustably supported on said wing main body to form a wing therewith, means forming a slot in the upper surface of said wing for developing boundary layer control thereover and blower means located aft of said partition and communicating with said slot means for inducing a flow therethrough.

EDWARD A. STALKER.